Figure 1:
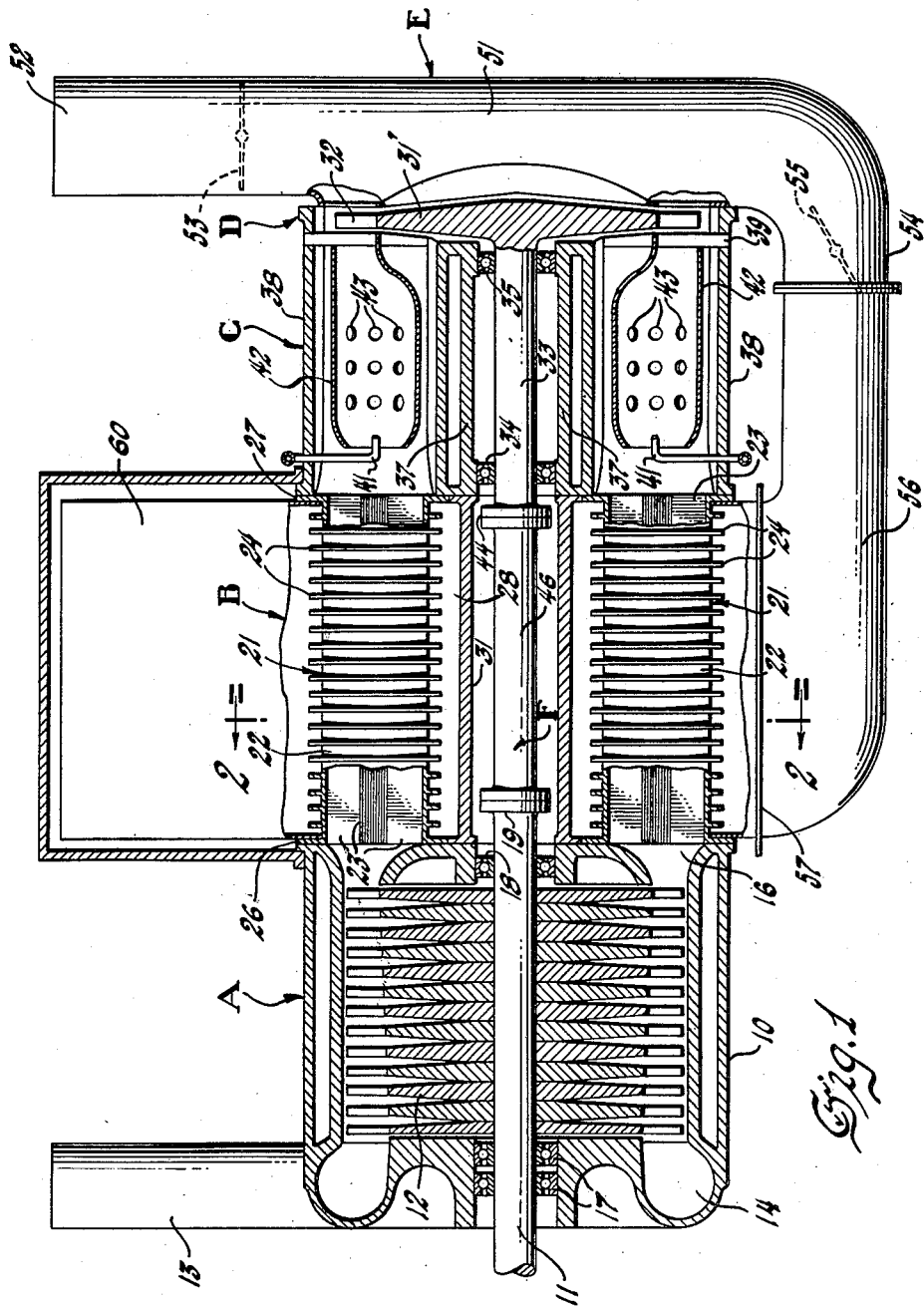

March 22, 1955 F. M. COUSINS 2,704,439
GAS TURBINE ENGINE WITH A REGENERATOR
Filed March 29, 1951 2 Sheets-Sheet 1

Inventor
Fred M. Cousins
By Willits, Helmig & Baillio
Attorneys

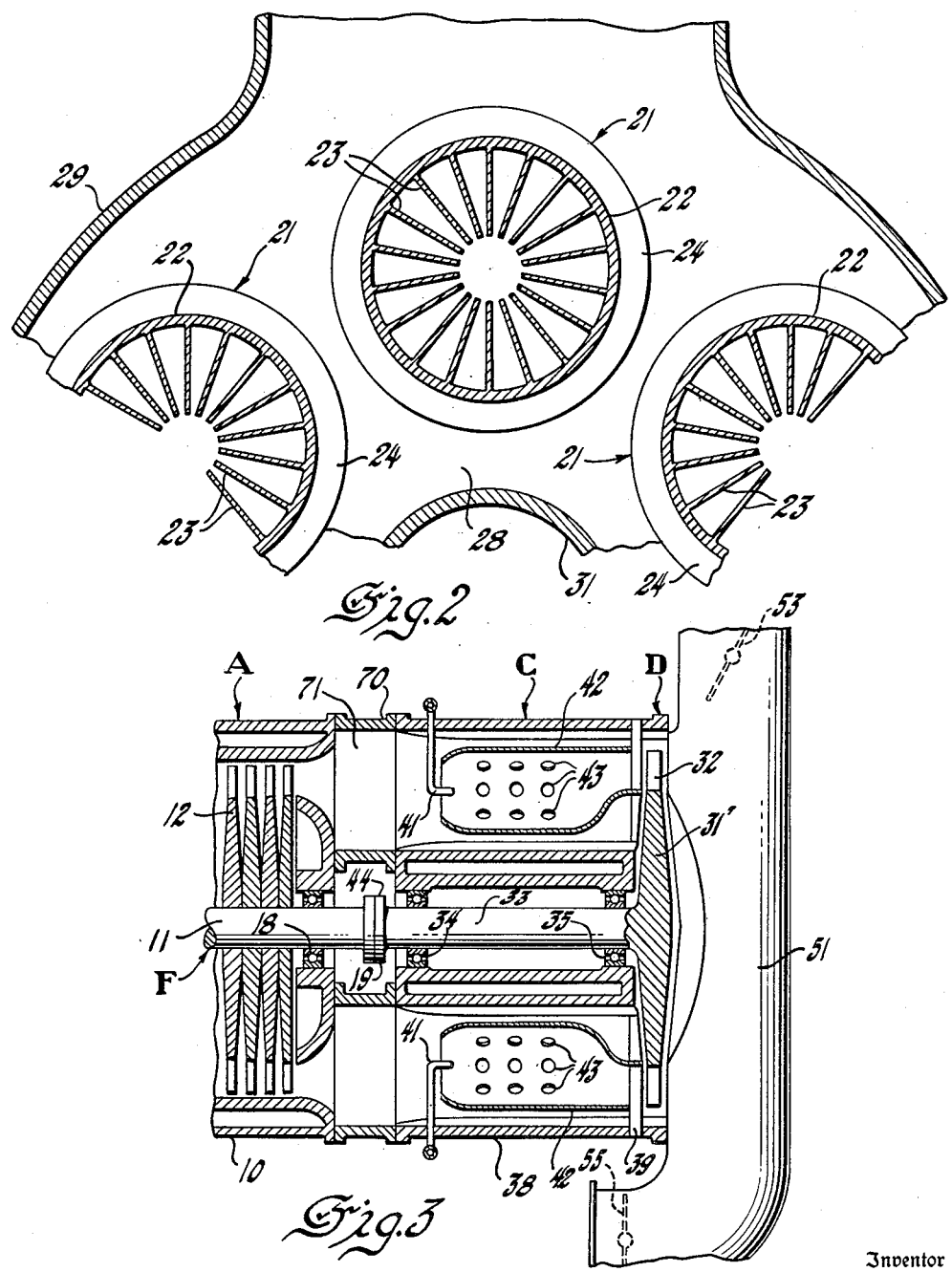

United States Patent Office 2,704,439
Patented Mar. 22, 1955

2,704,439

GAS TURBINE ENGINE WITH A REGENERATOR

Fred M. Cousins, Detroit, Mich., assignor to General Motors Corporation, Detroit, Mich., a corporation of Delaware Application March 29, 1951, Serial No. 218,166

4 Claims. (Cl. 60—39.51)

This invention relates to gas turbine engines, and more particularly to a gas turbine engine in which a heat exchange apparatus of improved character may be installed.

As is well known, a simple gas turbine engine comprises a compressor, a turbine which drives the compressor, and combustion apparatus which receives the compressor discharge, heats the air, and discharges it into the turbine. The combustion apparatus may be constituted by a single combustion chamber or by a number of chambers arranged in parallel, each supplying a part of the turbine nozzle.

It has been recognized that the efficiency of such engines may be increased by providing heat exchange apparatus in which the air is heated by the hot exhaust gases of the turbine between the compressor and the combustion section.

This invention is directed to a gas turbine engine arrangement with a heat exchanger having numerous advantages in structure and operation. A feature of the invention is the provision of an individual heat exchange unit corresponding to each one of a number of combustion chambers, the several heat exchange units being mounted in a common enclosure or plenum chamber into which the turbine exhaust may be discharged.

Another feature of the invention lies in the arrangement by which the entire heat exchange apparatus may be removed in the event of failure thereof and the remainder of the engine may be recoupled for operation without the heat exchanger. As a subsidiary feature, the turbine exhaust may be discharged either into the heat exchanger or may be shut off from the heat exchanger and discharged direct to atmosphere.

The principal objects of the invention are to provide an improved gas turbine engine, to provide an improved heat exchanger adapted for use in gas turbine engines, and to provide a gas turbine engine which may be operated either with or without a heat exchanger.

The manner in which these objects are achieved and the advantages of the invention will be clearly apparent to those skilled in the art from the succeeding description of the preferred embodiment of the invention and the accompanying drawings, in which Figure 1 is a longitudinal sectional view of a gas turbine engine; Figure 2 is a partial cross section view of the heat exchanger taken on the plane indicated by line 2—2 in Figure 1; and Figure 3 is a partial longitudinal section of the engine illustrating the arrangement with the heat exchanger removed.

Referring to Figure 1, the gas turbine engine there illustrated comprises as its principal elements a compressor A, a heat exchange apparatus B, combustion apparatus C, a turbine D, a turbine exhaust passage E, and shafting F which couples the rotors of the compressor and turbine.

The compressor, combustion apparatus, and turbine may be of various forms, as illustrated, by way of example, the compressor is of the axial-flow type comprising a casing 10, a shaft 11, and a rotor 12 comprising a plurality of disks on which blades are mounted. Blades (not illustrated) are fixed in the casing in the usual manner. It will be understood that the illustration of the compressor is of a schematic nature. The compressor inspires air through an inlet pipe 13 discharging into a scroll 14 and discharges the air through a diffuser 16 into the heat exchanger B. The compressor shaft 11 may be mounted in bearings 17 and 18, and terminates in a coupling flange 19. The diffuser is formed with a number of generally circular outlets disposed circumferentially around the shaft 11, each outlet discharging into a heat exchange unit 21.

Each heat exchange unit (Figs. 1 and 2) comprises a generally cylindrical straight tube 22 provided with integral longitudinal ribs 23 on the inside of the tube and circumferential ribs 24 on the outer surface of the tube. Each heat exchange unit is also provided with coupling flanges 26 and 27 at its forward and rearward ends, respectively, by which it may be bolted or otherwise secured to the compressor casing and to the combustion apparatus. The heat exchange units are contained in a generally annular enclosure or plenum chamber 28 defined by an outer wall 29 and an inner wall or shroud 31. The inner wall serves as a frame member of the engine.

The combustion apparatus C and turbine D, which are illustrated rather schematically, may follow known practice in the gas turbine field. The turbine comprises a wheel 31' bearing blades 32, which may be integral with a shaft 33 mounted in bearings 34 and 35. These bearings are mounted in an annular frame 37 which may be bolted to the tubular frame member 31. The turbine and combustion chambers are contained within an outer cylindrical casing 38, the annular turbine nozzle diaphragm 39 being mounted between the frame members 37 and 38 immediately ahead of the turbine wheel.

Each heat exchange unit discharges into a combustion chamber in which is mounted an inner shell or flame tube 42 open at its forward end to receive primary combustion air and formed with numerous openings or perforations 43 for secondary combustion and dilution air. The rear ends of the flame tubes are of the form of a sector of an annulus and are mounted in any suitable manner on the nozzle diaphragm 39 to discharge into the diaphragm. Fuel is injected into the flame tubes by nozzles 41 supplied in any suitable manner.

The turbine shaft 33 is provided with a coupling flange 44 by which it may be coupled to an intermediate shaft 46 which is also coupled to the flange 19 of the compressor shaft. This compressor shaft extends out of the engine and may be coupled in known manner to any desired load through a reduction gear (not shown) or otherwise.

The turbine exhaust system E comprises a chamber 51 into which the turbine discharges, this chamber being provided with an outlet 52 to atmosphere, a valve illustrated as a butterfly valve 53 being provided in this outlet. A second outlet 54 from the exhaust chamber, likewise fitted with a butterfly valve 55, may be connected by a duct 56 to the inlet flange 57 of the heat exchange apparatus. With the valve 53 closed and the valve 55 open, as illustrated in Figure 1, the gases discharged from the turbine flow into the heat exchanger and upwardly through the plenum chamber, over the outer surfaces of the heat exchange units 21, and out through the open top of the plenum chamber. The exhaust gases thus heat the compressed air flowing from the compressor to the combustion chambers. The exhaust from the heat exchanger may be circulated through a steam boiler 60 of any suitable construction for the recovery of additional heat energy from the exhaust gases.

It is believed that the operation of the device will be clear to those skilled in the art from the foregoing, but it may be outlined.

The engine may be brought up to speed by any suitable external motor (not shown). Air is drawn by the compressor through the inlet 13, compressed therein, and discharged through the heat exchange units 21 into the combustion chambers, where it is heated by the combustion of fuel discharged from the nozzles 41. The flame may be ignited by suitable known means (not shown). The hot combustion gases energize the turbine to drive the compressor once the engine has been brought to a speed at which it is self-sustaining. Normally, the valve 53 is closed and the valve 55 is open so that the turbine exhaust is circulated through the heat exchanger B and the boiler 60 as previously described.

In the event of a casualty to the heat exchange apparatus which renders it inoperative, the heat exchanger and boiler may be removed as illustrated in Figure 3. The heat exchanger may be removed by separating the compressor and combustion apparatus slightly and disconnecting and removing the intermediate shaft section 46. With the heat exchanger removed, the compressor A and combustion apparatus C may be moved closer together and coupled by a frame member 70 formed with ducts 71 to conduct compressed air directly from the compressor A to the individual combustion chambers. The coupling shaft 46 is left out and the shafts 11 and 33 are directly coupled together by means of the coupling flanges 19 and 44. The valve 55 is closed and the valve 53 opened to exhaust the turbine to atmosphere, and the engine may run as previously described, but with less efficiency, due to the elimination of the heat exchanger.

It may be noted that the heat exchanger is particularly suited for application to a gas turbine engine of the general character of that described. Among its advantages are the fact that the individual heat exchange units may be replaced or repaired individually. Also, the structure is relatively compact and makes possible the provision, with a minimum of distinct subassemblies, of engines either with or without heat exchangers.

The preferred form of the invention has been shown and described in order to illustrate the principles thereof. This description is not to be considered as limiting the invention, which is capable of many variations of form within the principles thereof.

I claim:

1. A gas turbine engine comprising in combination a compressor having a plurality of circularly disposed outlets, a turbine coaxially disposed with said compressor, a combustion chamber axially aligned with each of said compressor outlets, a heat exchange unit being disposed axially intermediate each aligned compressor outlet and corresponding combustion chamber enabling air to flow axially from said compressor outlet to the combustion chamber, means for removably mounting said heat exchange units between the compressor and the combustion chambers, a shaft coupling the turbine and compressor, said shaft including a removably mounted section disposed intermediate a compressor shaft section and a turbine shaft section, said removable shaft section being substantially longitudinally coextensive with said heat exchange units, means for connecting said compressor outlets to said combustion chambers and means for connecting said turbine and compressor shaft sections together upon the joint removal of said heat exchanger units and said removable shaft sections.

2. A gas turbine engine comprising in combination a compressor having a plurality of outlets, a turbine coaxially disposed with said compressor, a combustion chamber axially aligned with each of said compressor outlets, a heat exchange unit being disposed axially intermediate each aligned compressor outlet and corresponding combustion chamber enabling air to flow axially from said compressor outlet to the combustion chamber, means for removably mounting said heat exchange units between the compressor and the combustion chambers, a shaft coupling the turbine and compressor, said shaft including a removably mounted section disposed intermediate a compressor shaft section and a turbine shaft section, said removable shaft section being substantially longitudinally coextensive with said heat exchange units, means for connecting said compressor outlets to said combustion chambers and means for connecting said turbine and compressor shaft sections together upon the joint removal of said heat exchange units and said removable shaft sections, and means for connecting the turbine exhaust alternatively to the heat exchanger units or to an atmospheric exhaust duct.

3. A gas turbine engine comprising in combination a compressor having a plurality of outlets, a turbine coaxially disposed with said compressor, a combustion chamber axially aligned with each of said compressor outlets, a heat exchange unit being disposed axially intermediate each aligned compressor outlet and corresponding combustion chamber enabling air to flow axially from said compressor outlet to the combustion chamber, a plenum chamber means enclosing the heat exchanger units, means for removably mounting said heat exchange units between the compressor and the combustion chambers, a shaft coupling the turbine and compressor, said shaft including a removably mounted section disposed intermediate a compressor shaft section and a turbine shaft section, said removable shaft section being substantially longitudinally coextensive with said heat exchange units, means for connecting said compressor outlets to said combustion chambers and means for connecting said turbine and compressor shaft sections together upon the joint removal of said heat exchange units and said removable shaft sections, a conduit connecting the exhaust side of said turbine with the plenum chamber, means associated with said conduit for alternatively directing turbine exhaust to the heat exchanger units or to an atmospheric exhaust duct.

4. A gas turbine engine as defined in claim 3 in which said means associated with said conduit includes a first valve member intermediate the exhaust side of the turbine and the plenum chamber and a second valve member intermediate the exhaust side of the turbine and the atmospheric exhaust duct.

References Cited in the file of this patent

UNITED STATES PATENTS

| | | |
|---|---|---|
| 2,227,666 | Noack | Jan. 7, 1941 |
| 2,358,301 | Brauns | Sept. 19, 1944 |
| 2,432,359 | Streid | Dec. 9, 1947 |
| 2,470,729 | Stalker | May 17, 1949 |
| 2,516,066 | McLeod et al. | July 18, 1950 |
| 2,516,910 | Redding | Aug. 1, 1950 |
| 2,557,131 | Miller | June 19, 1951 |